US010232286B1

(12) United States Patent
Havelick (10) Patent No.: US 10,232,286 B1
(45) Date of Patent: Mar. 19, 2019

(54) CLOSED OIL EXTRACTION BOOTH WITH INTEGRATED VENTILATION SYSTEM

(71) Applicant: HAL EXTRACTION TECHNOLOGY, LTD, Arvada, CO (US)

(72) Inventor: Linn D. Havelick, Arvada, CO (US)

(73) Assignee: HAL Extraction Technology, Ltd., Arvada, CO (US)

( * ) Notice: Subject to any disclaimer, the term of this patent is extended or adjusted under 35 U.S.C. 154(b) by 226 days.

(21) Appl. No.: 15/376,484

(22) Filed: Dec. 12, 2016

Related U.S. Application Data (60) Provisional application No. 62/320,466, filed on Apr. 9, 2016.

(51) Int. Cl.
*B01D 11/02* (2006.01)

(52) U.S. Cl.
CPC .................. *B01D 11/0207* (2013.01)

(58) Field of Classification Search
CPC .................................. B01D 11/0207
See application file for complete search history.

(56) References Cited

U.S. PATENT DOCUMENTS

2008/0263968 A1* 10/2008 Day ................... E04B 1/34321
52/79.1

* cited by examiner

*Primary Examiner* — Sean E Conley
(74) *Attorney, Agent, or Firm* — Shifrin Patent Law; Dan Shifrin (57) ABSTRACT

An oil extraction booth, comprising: first and second prefabricated modules securable to each other to create a first air-tight interior work space; an inlet blower; an exhaust blower; a sensor sensitive to the presence of a gas within the work space; and a controller electrically coupled to control the speed of the inlet blower and the exhaust blower and electrically coupled to receive a signal from the sensor indicative of an amount of the gas in the work space. The controller is configured to operate the inlet blower and the outlet blower at a first speed when the amount of the gas detected by the sensor is less than a first predetermined value and operate the inlet blower and the outlet blower at a second, higher speed when the amount of the gas equals or exceeds the first predetermined value.

16 Claims, 14 Drawing Sheets

Sec. B-B

CLOSED OIL EXTRACTION BOOTH WITH INTEGRATED VENTILATION SYSTEM

RELATED APPLICATION DATA

The present application is related to, and claims the benefit of, commonly-owned and U.S. Provisional Application Ser. No. 62/320,466 entitled CLOSED OIL EXTRACTION BOOTH WITH INTEGRATED VENTILATION SYSTEM, filed on Apr. 9, 2016, which application is incorporated herein by reference in its entirety.

TECHNICAL FIELD

The present invention relates generally to the extraction of oil from, for example, plant material, and, in particular, to an extraction booth configured to allow for the safe use of hazardous solvents to accomplish the extraction.

BACKGROUND ART

A common method for the recovery of oils from plant material is to extract the oils with a solvent suitable for leaching the oils from the plant material. The solvents used during extraction include, but are not limited to, acetone, butane, carbon dioxide, ethanol, hexane, isopropyl alcohol, and propane. Many of the solvents used in extraction have hazardous properties such as flammability, explosive vapors, physiologic damage, and/or asphyxiant properties. These hazards may occur during use of open containers when the solvent evaporates, during solvent spills or leaks, when the spent solvent-wetted plant material is removed from the extraction system, and during venting of solvent from extraction equipment. The equipment and systems used during extraction includes a variety of devices including, but not limited to, leaching vessels, extraction vessels, distillation systems, condensers, cooling and heating baths, pipes, tubing, vacuum pumps, and pressurized gas bottles.

In many countries, regulations and codes are in place to protect persons working with flammable and toxic substances. These regulations and codes often require the use of facilities equipped with explosion-proof electrical equipment, lighting and fixtures; explosion blast venting capabilities, ventilation rated for use with hazardous materials; and monitoring and alarm systems to detect the presence of hazardous conditions. The construction or retrofit of a room in new or existing buildings with hazardous-rated equipment is expensive. Each component or equipment unit may require rating as explosion-proof or intrinsically safe.

SUMMARY OF THE INVENTION

An oil extraction booth is provided that can be assembled from prefabricated wall and ceiling panels and includes a full ventilation system. All electrical lighting and equipment is located outside of the interior of the booth, reducing the need for explosion-proof and/or intrinsically safe equipment and providing a safe working environment for personnel. The booth further includes a monitoring system to alert personnel if the concentration of a dangerous gas or liquid exceeds a predetermined level.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Embodiments of the present invention provide an oil extraction booth that can be economically assembled on-site and that provides an explosion-proof working environment for personnel, thereby reducing the need for explosion-proof and/or intrinsically safe equipment.

Figure 1:
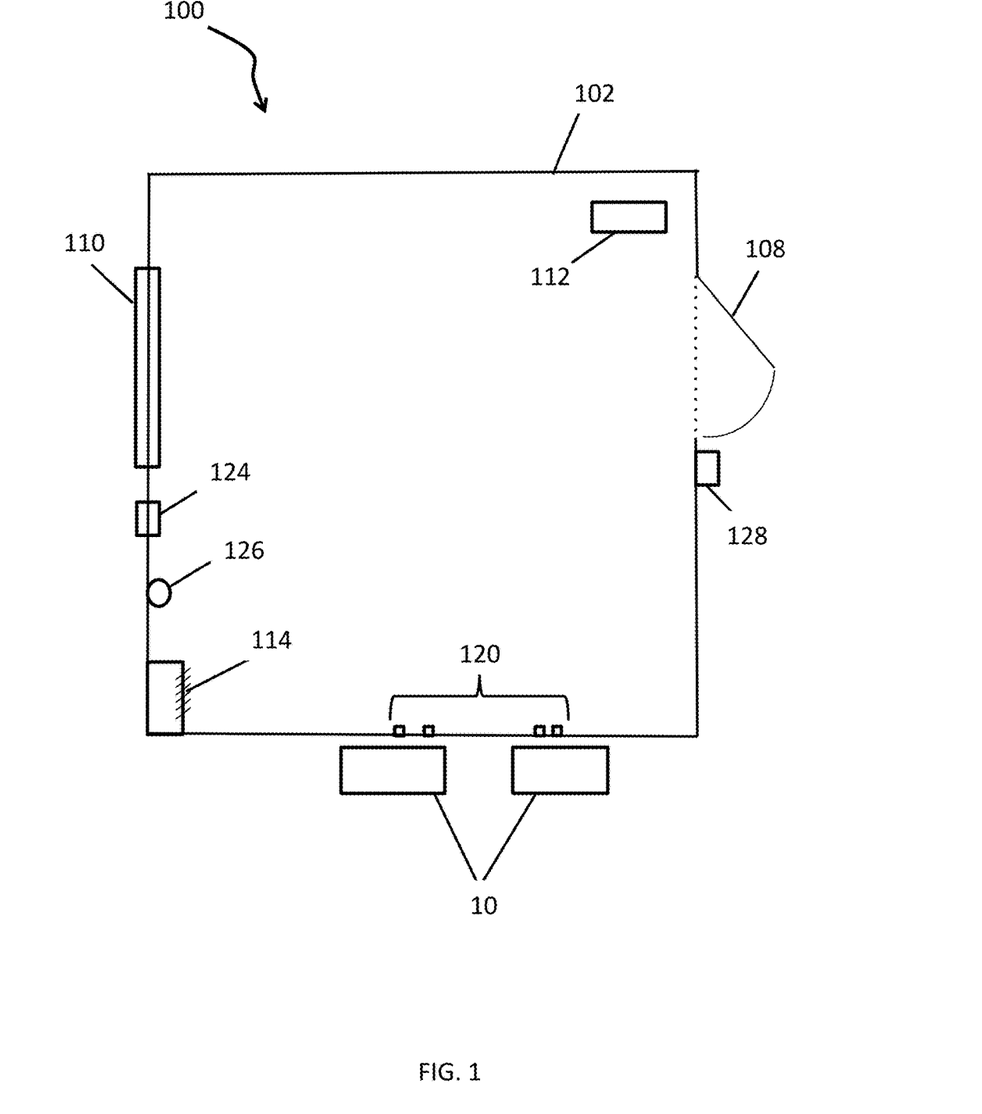
FIG. 1 illustrates a floor plan of an embodiment of an oil extraction booth of the present invention.

FIG. 1 illustrates a floor plan of an embodiment of an oil extraction booth 100 of the present invention. The booth 100 includes walls 102 and a ceiling 104. The booth 100 may also include a floor 106 to be assembled with the walls 102 and ceiling 104. Alternatively, the walls 102 may be assembled on an existing floor. If the walls 102 are assembled on an existing floor, they may rest on the floor or be secured to the floor with, for example, bolts. The booth 100 also includes an access door 108 in one wall 102 that provides a tight seal when closed, allows for explosion-venting pressure relief, and includes, for example, a panic bar for quick exit if necessary. At least one sealed window 110 in a wall 102 allows light into the booth 100 from lighting fixtures external to the booth 100 as well as views into and out of the booth 100. Other sealed windows may be installed in the walls 102 or ceiling 104 with additional external lighting fixtures. The windows 110 may comprise sheets of Plexiglas® acrylic, glass, or other material to provide explosion-venting pressure relief.

Figure 2:
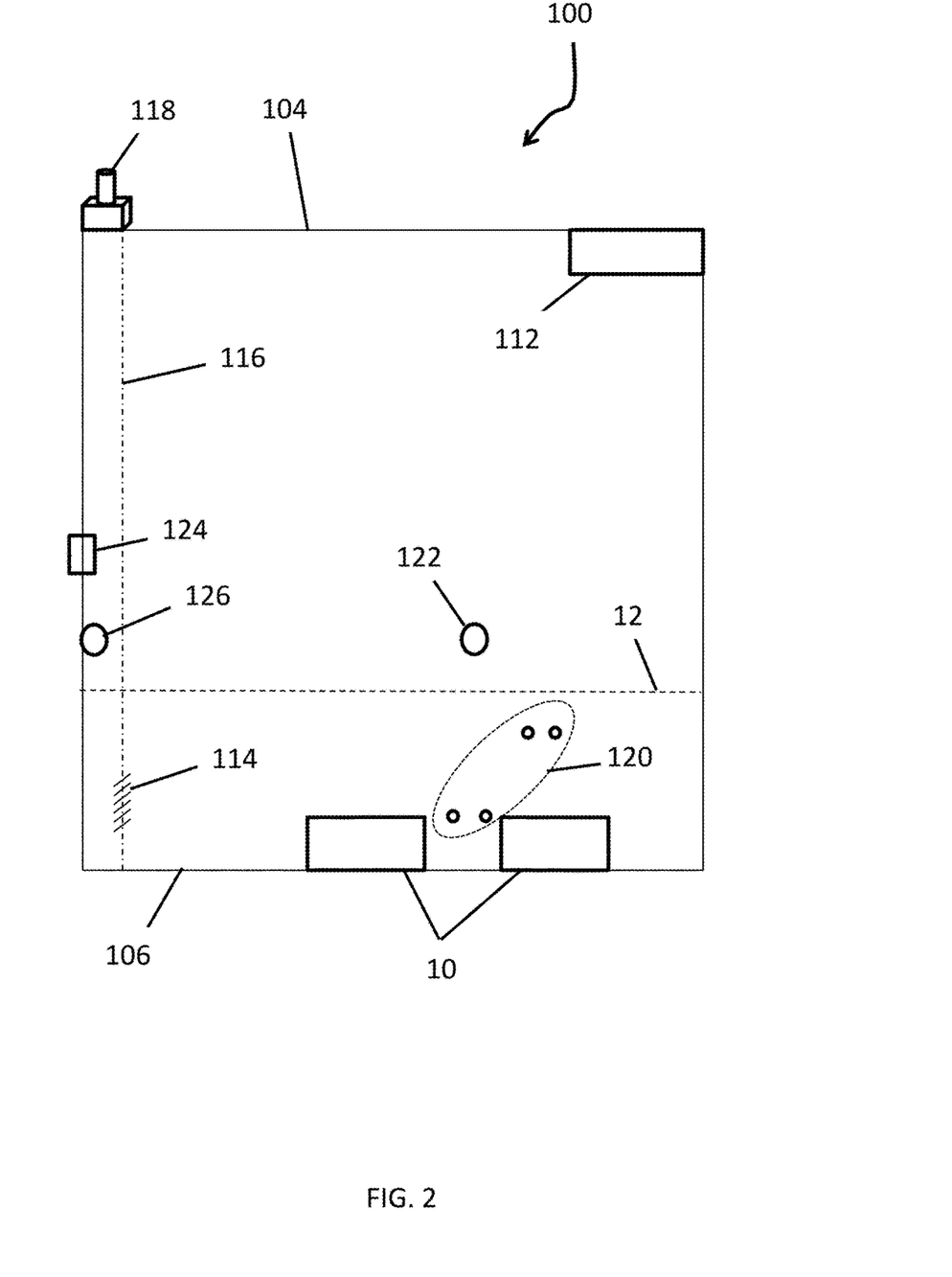
FIG. 2 illustrates a side elevation view of the oil extraction booth of FIG. 1.

Ventilation and air movement is provided by an air intake 112, located high on one wall 102 and an exhaust vent 114, located low on an opposite wall 102, such as in a diagonally opposite corner. Filtered air enters the booth 100 through the air intake 112 and is pulled out of the room through the exhaust vent 114. As illustrated in FIG. 2, the exhaust vent, which may be louvered, provides a path for the air through an exhaust duct 116 running vertically along the same wall with air flow provided by an exhaust fan 118 mounted outside of the booth 100 above the ceiling 104. The location of the air intake 112 and exhaust vent 116 enhances the sweep flow of air through the booth 100 and the capture of heavier-than-air gases.

Equipment 10, such as water chiller, air compressor, dryer, vacuum pumps, water heater, lighting, and unrated instrumentation, is located outside of the booth 100 with appropriate piping entering the booth 100 through ports 120, 122 in one or more of the walls 102. Placing all of the equipment 10 outside of the booth 100 enables the use of less expensive electrical equipment that is not rated as explosion-proof or intrinsically safe and improves the safety of the workers. Thus, an unrated electrically-powered water chiller may be used with the coolant circulated in pipes through the ports 120. Similarly, an air-driven mixer may be used inside the booth 100 powered by a compressor outside the booth 100.

Adding to the safety of the booth 100 is at least one hazardous gas monitor 124 and sensor(s) 126 mounted on a wall 102. The sensors 126 are selected to be sensitive to the particular liquids or gases that may be present in the booth 100. The monitor 124 may be set to trigger an alarm at a predetermined fraction of the lower explosive or toxic limits of the gases or liquids. The monitor 124 may also be coupled with the ventilation system to increase the air flow at certain detection levels. The monitor 124 may also be coupled with the mechanism that supplies solvent such that the supply is automatically shut off if excessive flammable gas or liquid is detected.

Preferably, a panel 128 for the control of the equipment 10 is secured to the outside of a wall panel adjacent to the door 108, further enhancing the safety of booth 100 by removing all electrical equipment and connections from inside the booth 100.

One or more work tables 12 of any appropriate dimensions may be placed in any convenient location in the booth 100 on which extraction equipment may be set.

The booth 100 may be assembled on-site from pre-constructed wall and ceiling panels 102, 104; thus, the booth 100 may have any dimensions within practical limits. The following dimensions are approximate and provided as possible examples only. The room may also be made available in standard sizes, such as 8 feet long, 8 feet wide, and 8 feet high for a small-scale room or 16 feet long, 12 feet wide, and 10 feet high for a larger-scale room. The panels may be metal or any other appropriate material and may be assembled with bolts, cams, or other fasteners. Depending on the dimensions of the booth 100 to be assembled, the panels may be transported to the site on one or more pallets. Once the booth 100 has been assembled, it may be connected to existing electrical and water facilities and quickly made operational. The panels may also be conveniently disassembled and transported to a new site for reassembly.

The door 108 may be 30 inches by 80 inches; air intake 112 may be 12 inches by 24 inches; the exhaust vent 114 may be 12 inches by 12 inches and located 12 inches above the floor; the exhaust duct 116 may be 6 inches by 12 inches; the ports 120 may be 1 inch in diameter; and the dryer vent 122 may be 4 inches in diameter. The exhaust fan 118 may be variable-speed, single-speed, or multiple-speed. For example, if the exhaust fan 118 is a single-speed fan, it may be selected to move approximately 300 cubic feet per minute (CFM). If the exhaust fan 118 is a two-speed fan, it may be selected to move approximately 150 CFM or 300 CFM. Depending on the size of the booth 100, more than one ventilation system may be desired, each having an air intake 112, an exhaust vent 114, an exhaust duct 116, and an exhaust fan 118.

The extraction booth 100 provides a safe and economical working environment, easily assembled in an existing facility while reducing the need for expensive rated equipment.

Figure 3:
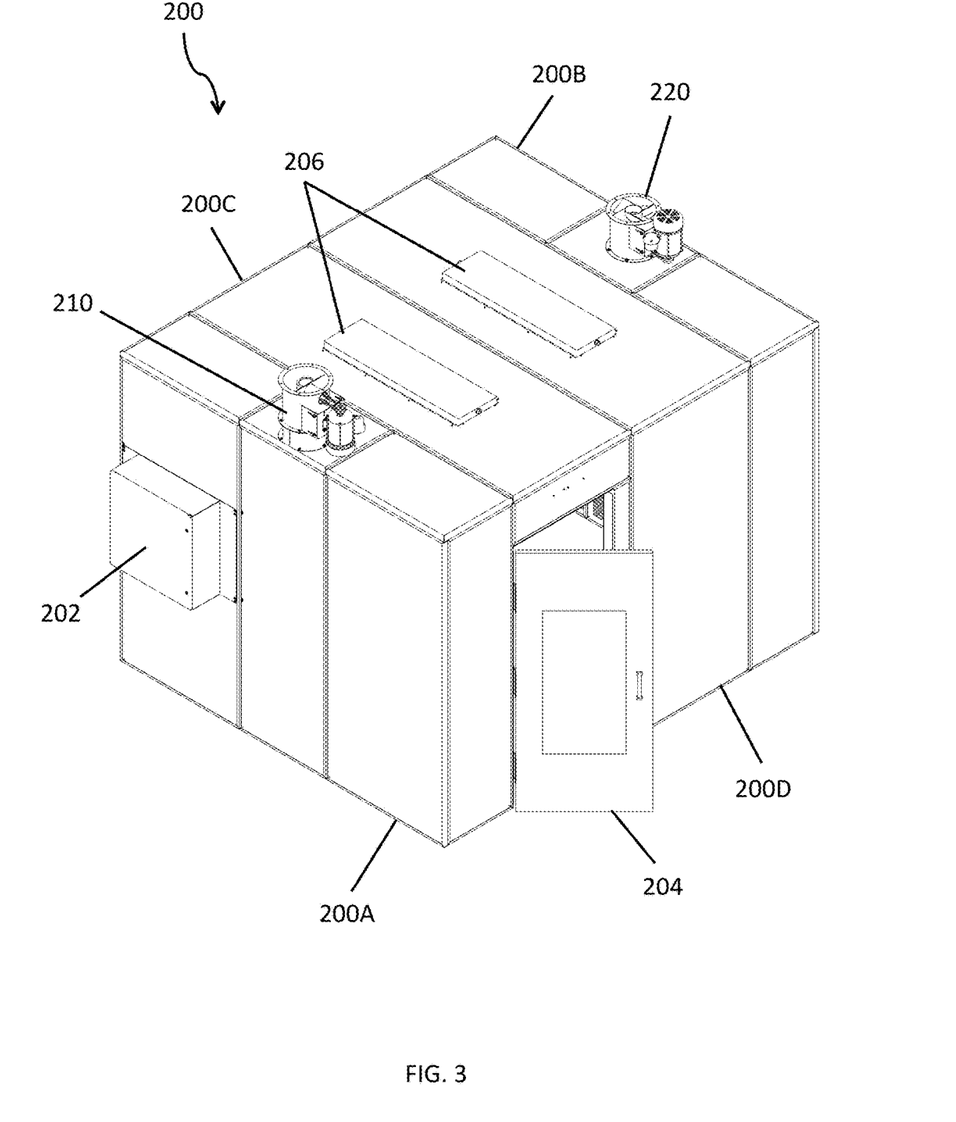
FIG. 3 is a top perspective view of another embodiment of a modular oil extraction booth of the present invention having one expansion module.
Figure 4:
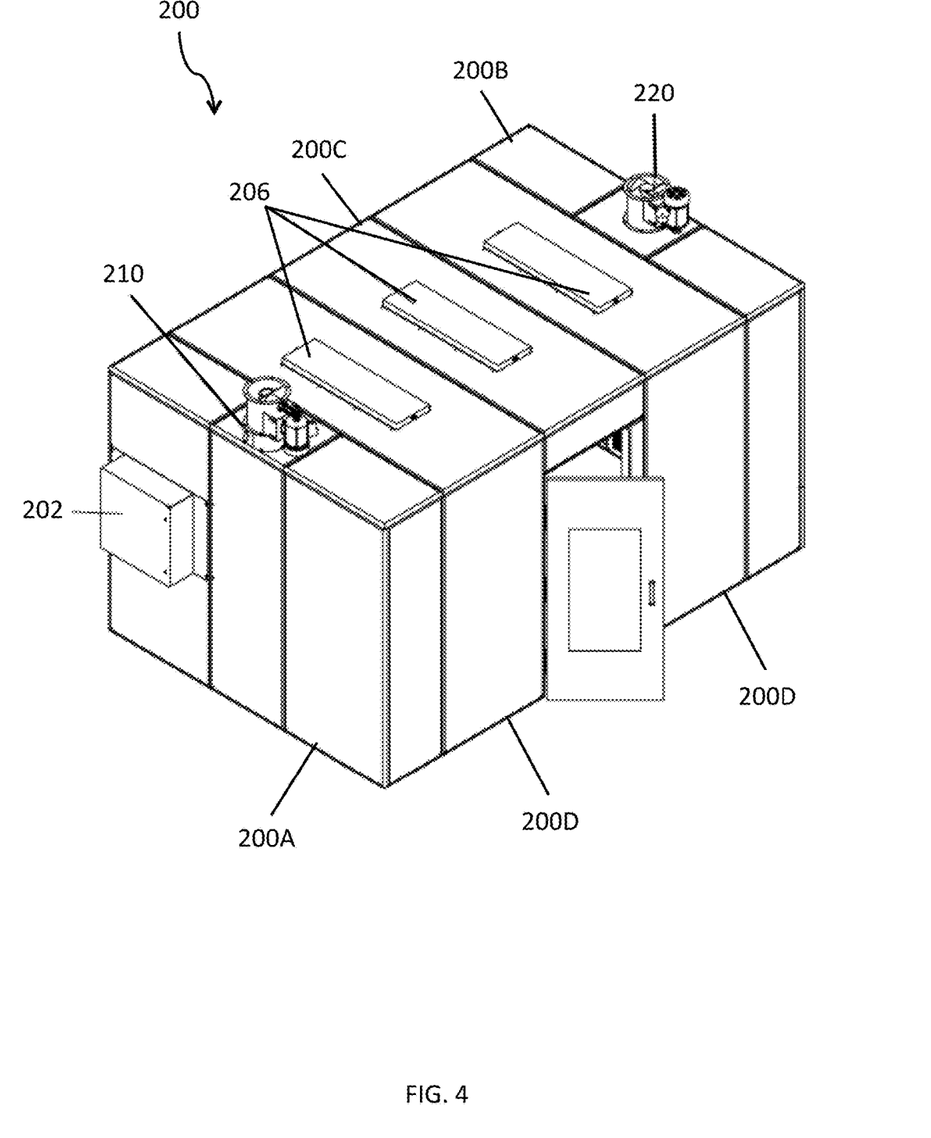
FIG. 4 is a top perspective view of the oil extraction booth of FIG. 3 having two expansion modules.

In another embodiment, the extraction booth may be modular in configuration. FIG. 3 is a top perspective view of such an oil extraction booth 200 having left and right side modules 200A, 200B, a module with a door 200C, and one expansion module 200D. When assembled and secured to each other, the modules 200A, 200B, 200C, 200D create an airtight interior work space. In the illustrated configuration, the expansion module 200D is placed between the right side module 200B and the door module 200C, although it may be placed instead between the left side module 200A and the door module 200C. The modules 200A, 200B, 200C, 200D are secured to each other in a sealed manner. While the booth 200 illustrated in FIG. 3 includes a single expansion module 200D, the booth 200 may be assembled with no expansion module 200D or may be assembled with more than one, depending upon the desired size of the booth 200. By way of example, FIG. 4 illustrates a booth 200 with two expansion modules 200D, one on each side of the door module 200C, although they may instead be both placed on one side or the other of the door module 200C. It will also be appreciated that a door may be incorporated into either of the side modules 200A, 200B or in an expansion module 200D.

An electrical control panel 202 may be secured to any of the modules 200A, 200B, 200C, 200D. For illustrative purposes, the control panel 202 is shown in the FIGs. as being secured to the left side module 200A. The control panel 202 allows a user to control lighting and the ventilation inside the booth 200, among other possible electrical equipment. Some controls may be on the outside of the control panel 202, some on the inside, some on both the inside and the outside, all on the outside, or all on the inside. All electrical equipment is rated as explosion-proof.

The door module 200C includes an air-tight door 204, which, when closed, prevents air and other gases from entering into or escaping from the booth 200. The door and expansion modules 200C, 200D also include lighting fixtures 206 in their ceilings (although the side modules 200A, 200B may include lighting fixtures 206 in their ceilings or walls as well). As with the door 204, the lighting fixtures 206 are sealed to prevent air infiltration. The fixtures 206 as well as all of the electrical controls and other equipment are also rated for hazardous environments and, therefore, safe to operate where flammable gasses may be present.

Figure 13:
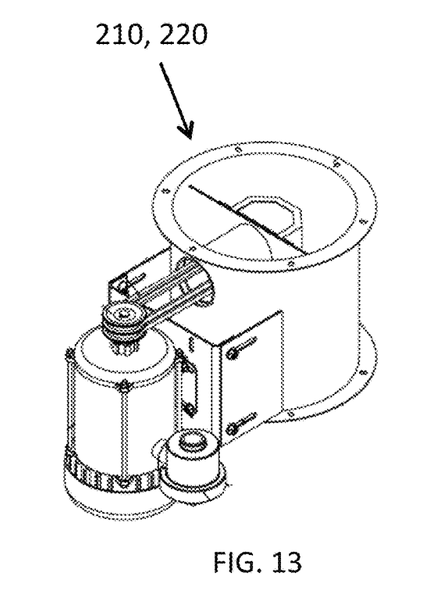
FIG. 13 illustrates an embodiment of an exhaust fan that may be used with the oil extraction booth of the present invention.

The two side modules 200A, 200B also include ventilation units 210, 220, respectively, mounted on their ceilings. The two units 210, 220 may be the same type of unit with one unit 210 coupled to ductwork to blow fresh air into the booth 200 while the other unit 220 is mounted in the reverse direction to exhaust air from the booth 200. The exhaust unit 220 is coupled to ductwork to vent the exhaust to the outdoor atmosphere. One type of ventilation unit to both blow fresh air into the booth 200 and to exhaust air from the booth 200, illustrated in FIG. 13, may be a tube axial exhaust fan belt-driven by a variable speed motor rated for use in hazardous locations.

Figure 5:
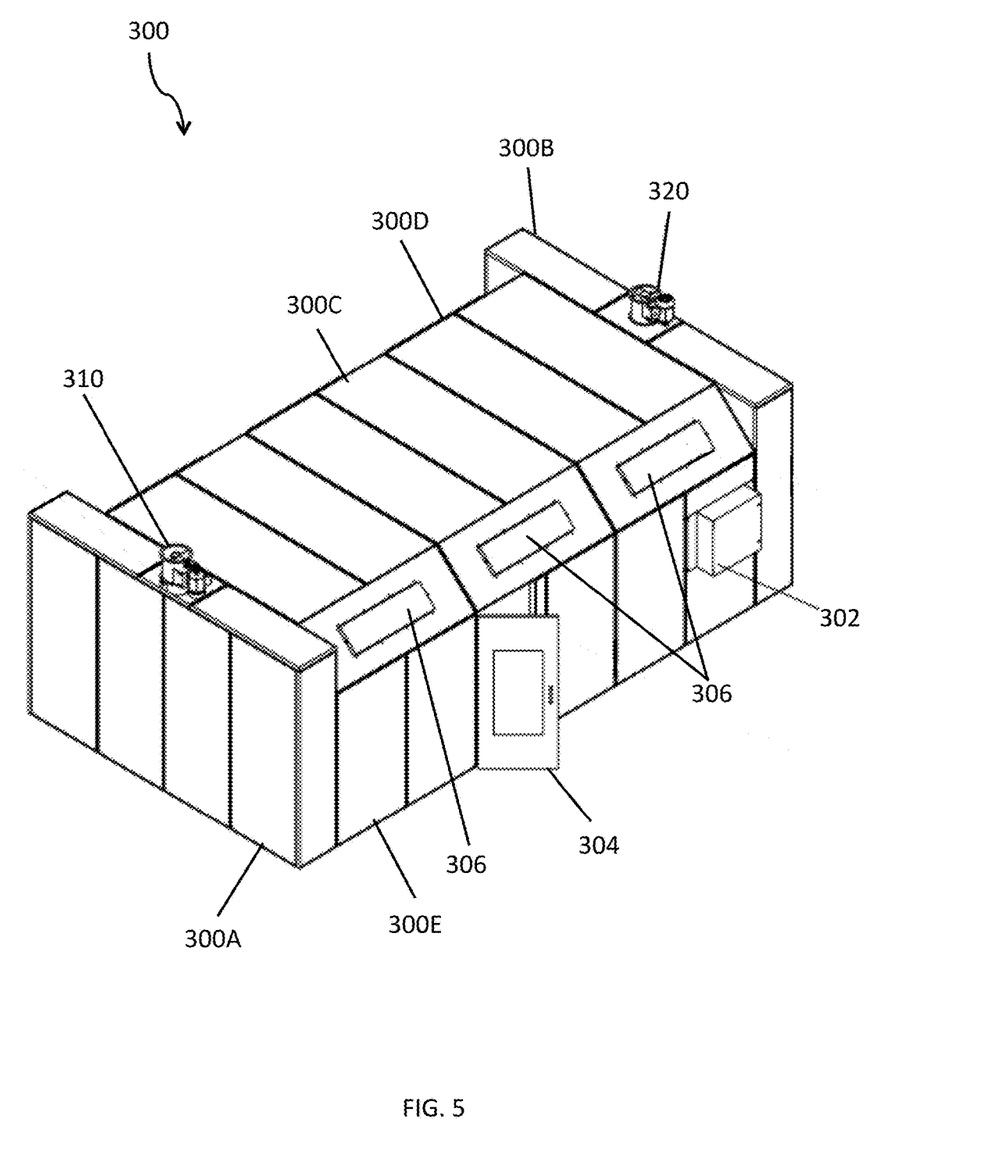
FIG. 5 is a top perspective view of another embodiment of an oil extraction booth of the present invention with three modules of a different configuration.

FIG. 5 illustrates an embodiment of an oil extraction booth 300 of the present invention in a different configuration. The booth 300 includes left and right side modules 300A, 300B, a module 300C with a door 304, a module 300D with an electrical control panel 302, and an expansion module 300E. The modules 300A, 300B, 300C, 300C, 300D are secured to each other in a sealed, air-tight manner. While the booth 300 illustrated in FIG. 5 includes a single expansion module 300E, it may be assembled with no expansion module 300E or may be assembled with more than one, depending upon the desired size of the booth 300. It will be appreciated that the control panel 302 may be installed on any of the other modules. The side modules 300A, 300B include ventilation units 310, 320 mounted in their ceilings to blow air into and exhaust air and gases from the booth 300.

Figure 6:
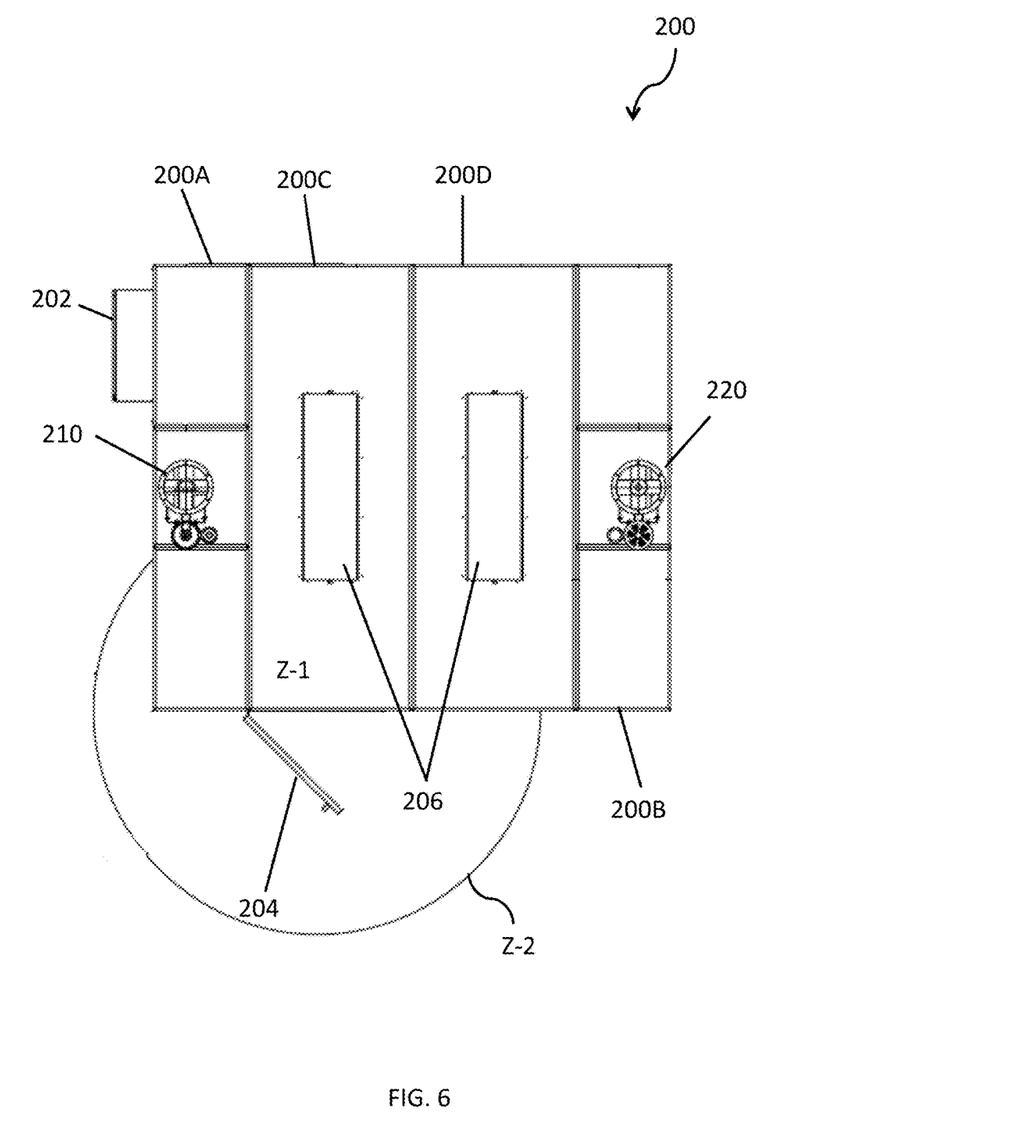
FIG. 6 is a top view of the oil extraction booth of FIG. 3.
Figure 7:
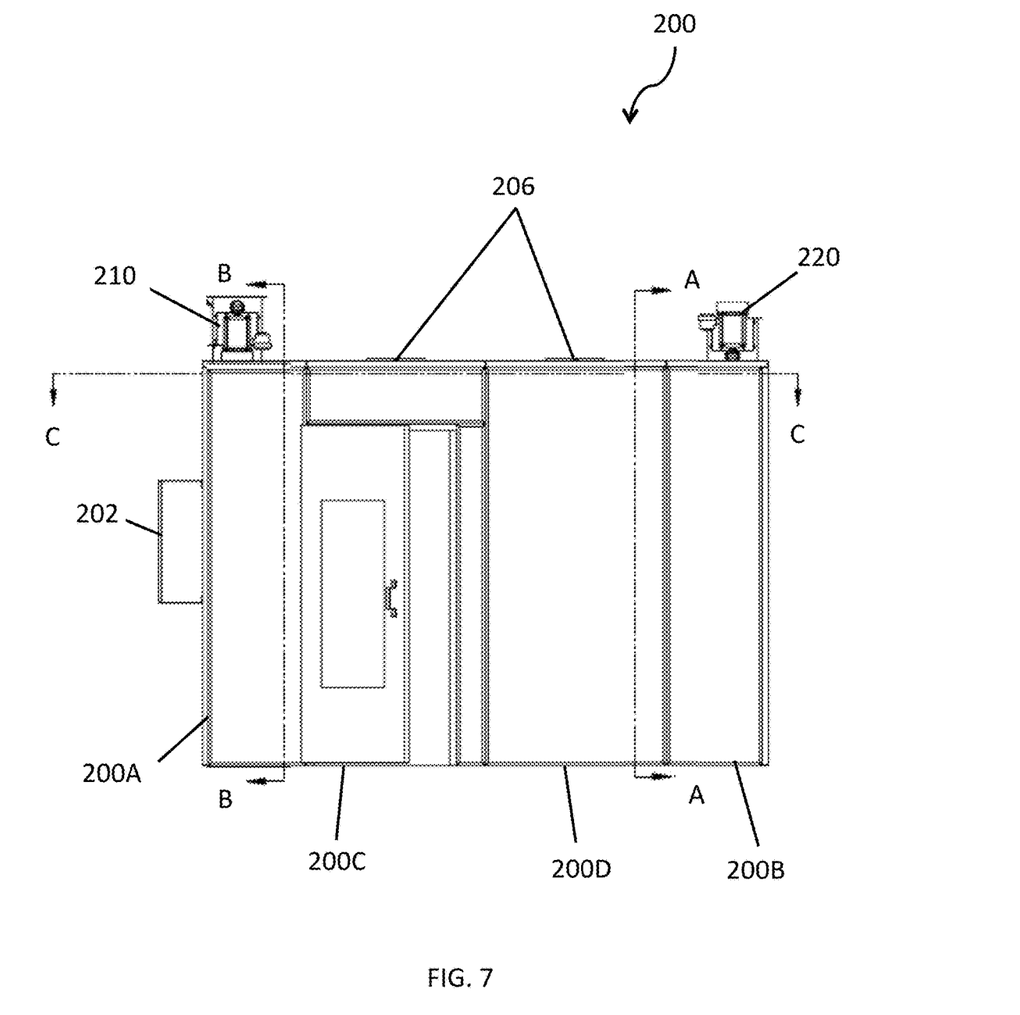
FIG. 7 is a front view of the oil extraction booth of FIG. 3.
Figure 8:
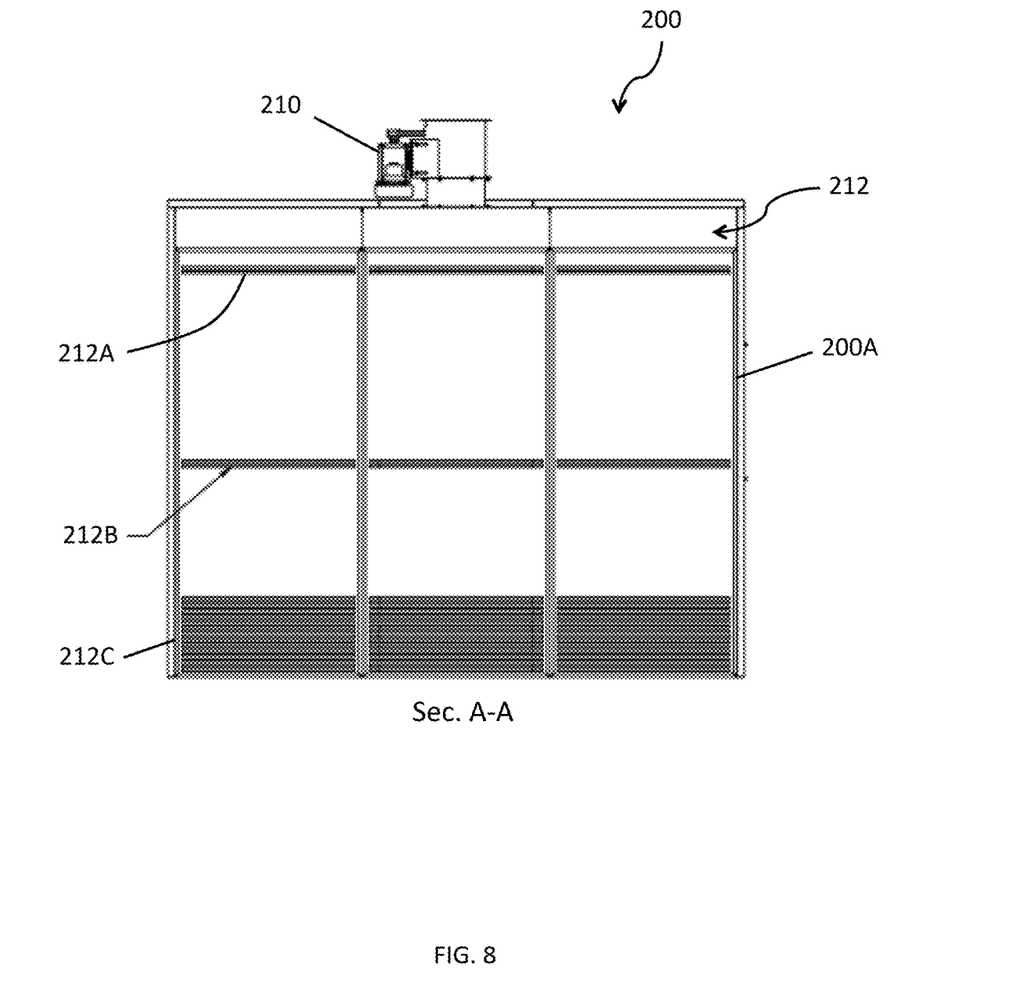
FIG. 8 is a cross-sectional view of the oil extraction booth of FIG. 3 taken along section line A-A of FIG. 7.
Figure 9:
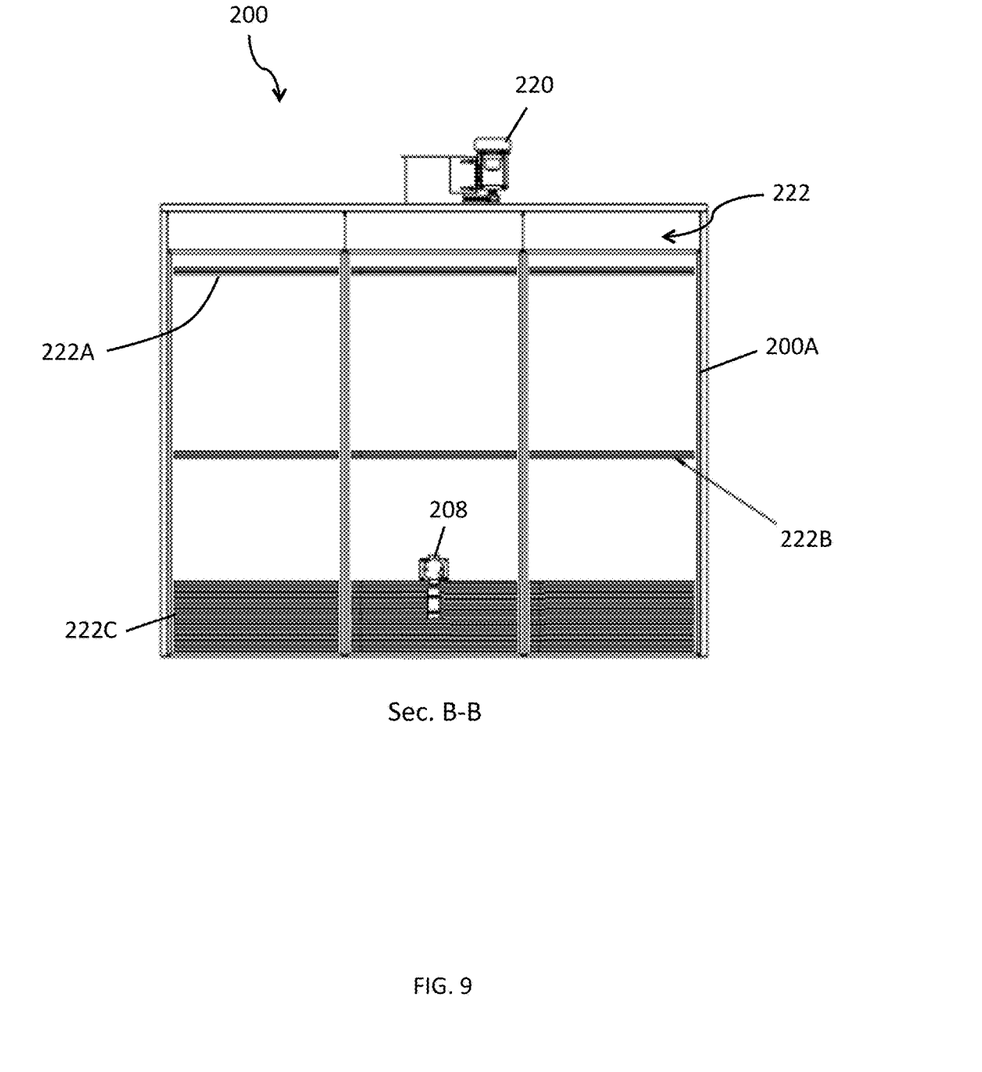
FIG. 9 is a cross-sectional view of the oil extraction booth of FIG. 3 taken along section line B-B of FIG. 7.

FIGS. 6 and 7 are top and side views, respectively, of the oil extraction booth 200. Arrows above the ventilation units 210, 220 indicate the direction of air flow into and out of the booth 200. FIGS. 8 and 9 are left and right side cross-sectional views of the extraction booth 200 taken along the section lines A-A and B-B, respectively, in FIG. 7. Referring to FIG. 8, fresh air is pulled into the booth 200 by the intake blower unit 210. The air flows into an air duct 212 across the top and down the side 200A of the booth 200. The air then flows out of the duct 212 through upper, middle, and lower vents 212A, 212B, 212C. The upper and middle vents 212A, 212B each have an open area that is smaller relative to the open area of the lower vent 212C. As a result, more air flows out of the lower vent 212C than through either of the other two vents 212A, 212B.

As illustrated in FIG. 9, the other side 200B of the booth 200 has a reverse configuration: fresh air from the vents 212A, 212B, 212C flows across the booth 200 and enters a duct 222 through upper, middle, and lower vents 222A, 222B, 222C. As with the vents 212A, 212B, 212C on the other side of the booth 200, the upper and middle vents 222A, 222B have areas that are smaller relative to the area of the lower vent 222C. As a result, more air flows into the lower vent 222C than through either of the other two vents 222A, 222B. The air is then removed from the booth 200 by the exhaust blower unit 220. The air flowing across the lower portion of the booth 200 also flows across a gas detection sensor 208 located on the "downwind" side of the booth 200 and preferably near the floor of the booth 200 because the hazardous gasses that might typically be present are heavier than air. One type of gas detection sensor 208, illustrated in FIG. 14, may be an infrared gas detector rated for use in a hazardous location and calibrated to determine when the level of hazardous gas exceeds one or more predetermined levels, as will be described below.

Figure 10:
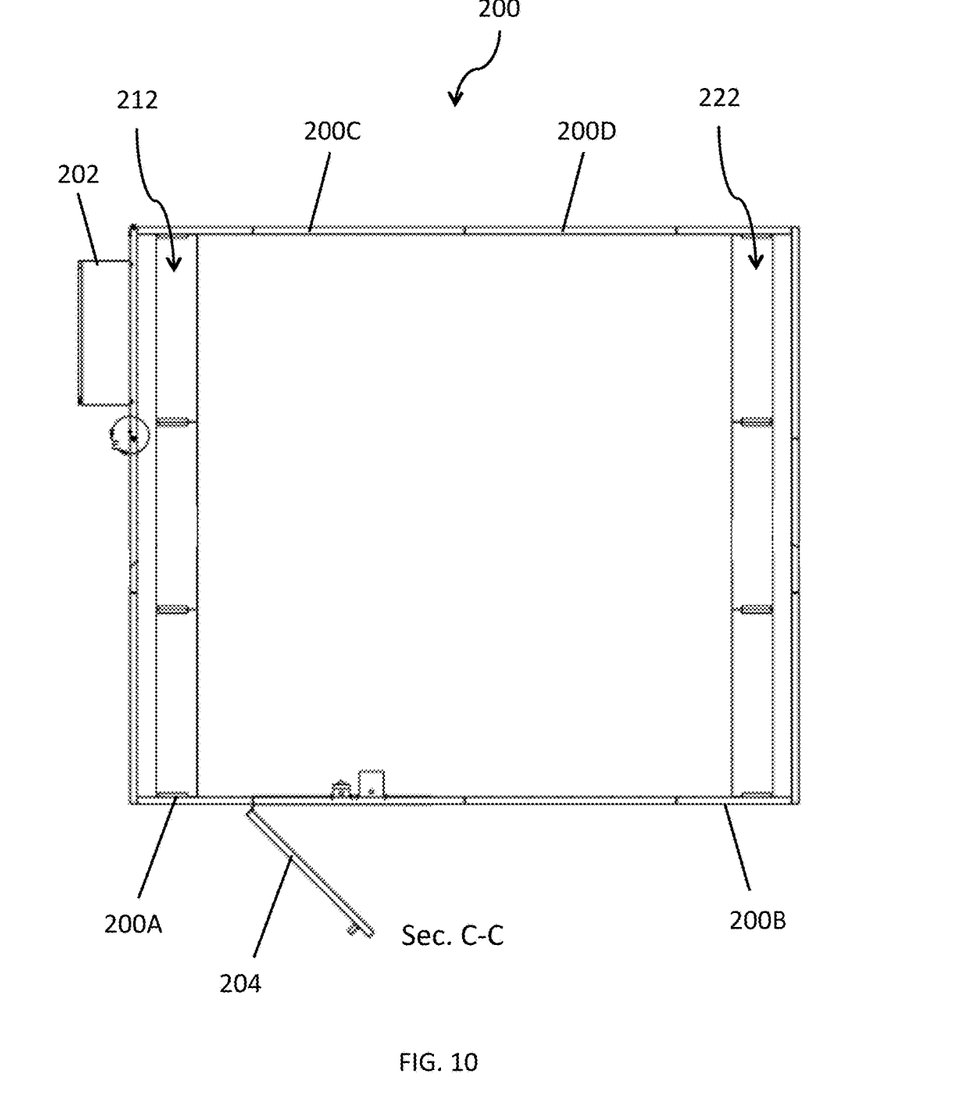
FIG. 10 is a cross-sectional view of the oil extraction booth of FIG. 3 taken along line C-C of FIG. 7.

FIG. 10 is a cross-sectional top view of the oil extraction booth of FIG. 3 taken along line C-C of FIG. 7 and depicts the air ducts 212, 222 on the left and right sides 200A, 200B, respectively, of the booth 200.

Figure 11:
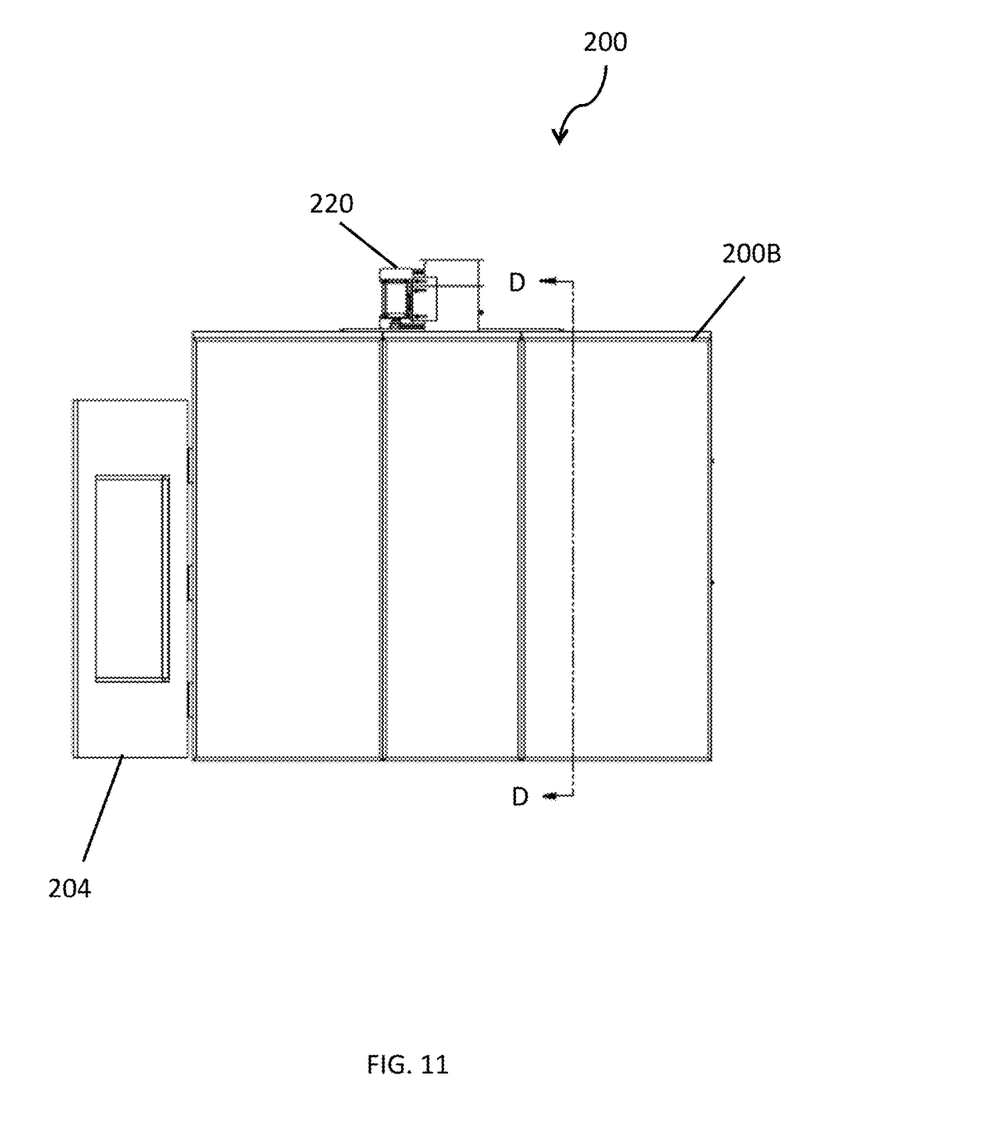
FIG. 11 is a side view of the oil extraction booth of FIG. 3.
Figure 12:
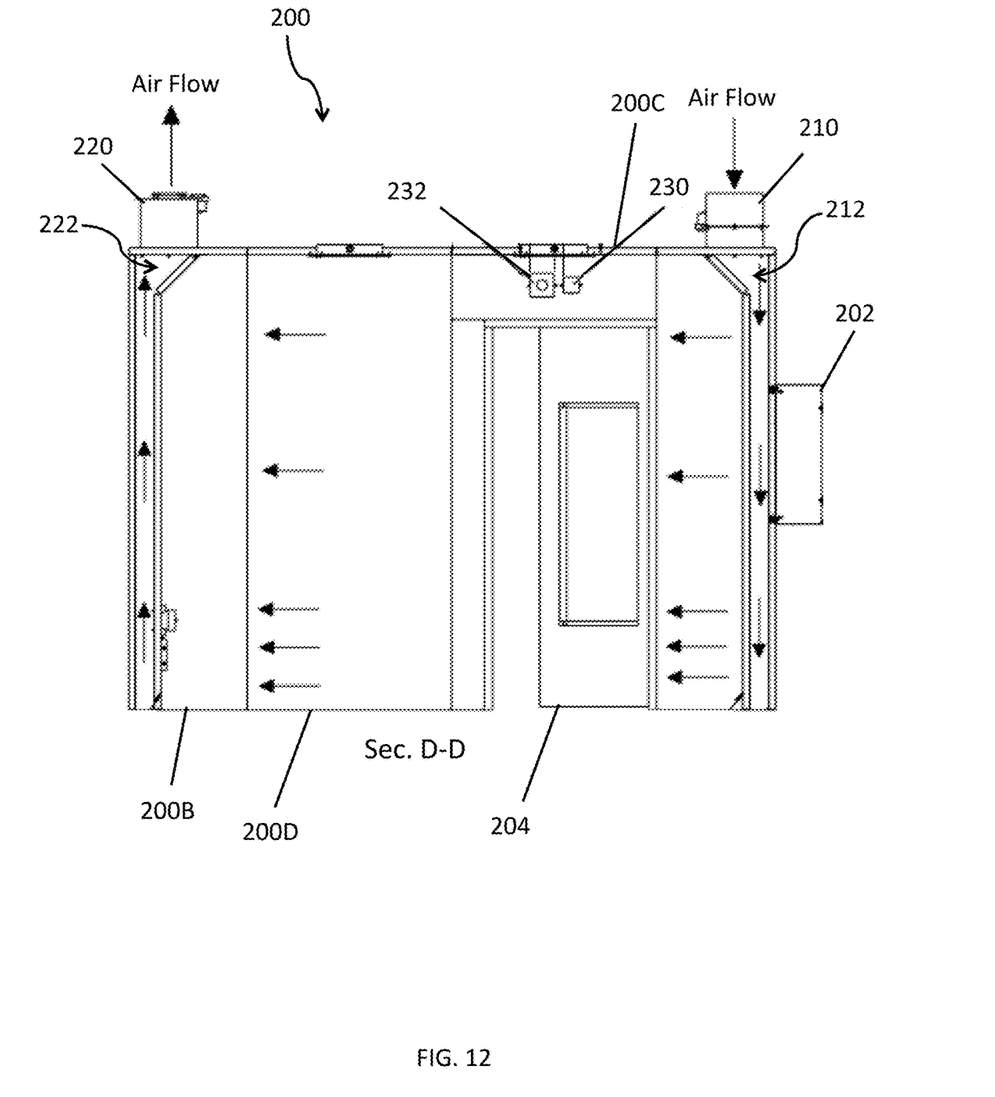
FIG. 12 is a cross-sectional view of the oil extraction booth of FIG. 3 taken along line D-D of FIG. 11 illustrating airflow through the room.

FIG. 11 is a side view of the oil extraction booth 200 and FIG. 12 is a cross-sectional side view taken along the section line D-D of FIG. 11. The arrows represent the airflow into the intake blower 210 down the duct 212, out the vents 212A, 212B, 212C, across the booth 200, into the vents 222A, 222B, 222C, up the duct 222, and out through the exhaust blower 220. The number of arrows across each of the top, middle, and bottom of the booth 200 represents the relative amount of air flowing across those elevations of the room, with the majority of the air flowing across the lower portion of the booth 200, such as the lower 12 inches of the booth 200.

Figure 14:
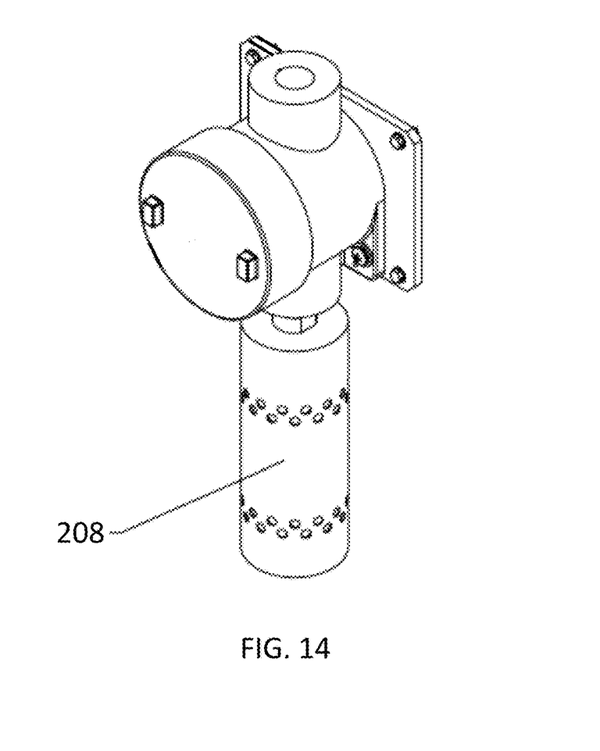
FIG. 14 illustrates an embodiment of an infrared gas detector assembly that may be used with the oil extraction booth of the present invention.

The ventilation system in the booth 200, comprising the intake blower 210 and exhaust blower 220 and the associated ductwork and vents, preferably maintains a base flow rate of, for example, 500 cubic feet per minute when the room is occupied. If the sensor 208 detects flammable or hazardous gas that equals or exceeds a first predetermined level, such as approximately 10% above a lower explosive limit, the system automatically increases the flow rate, such as to 1,220 cubic feet per minute and may activate a visual warning light 230 (FIG. 12). If the sensor 208 detects flammable or hazardous gas in excess of a second predetermined level, such as approximately 25% above a lower explosive limit, the system automatically activates an audible alarm 232 (FIG. 12). One type of gas detection sensor 208 is illustrated in FIG. 14.

Figure 15:
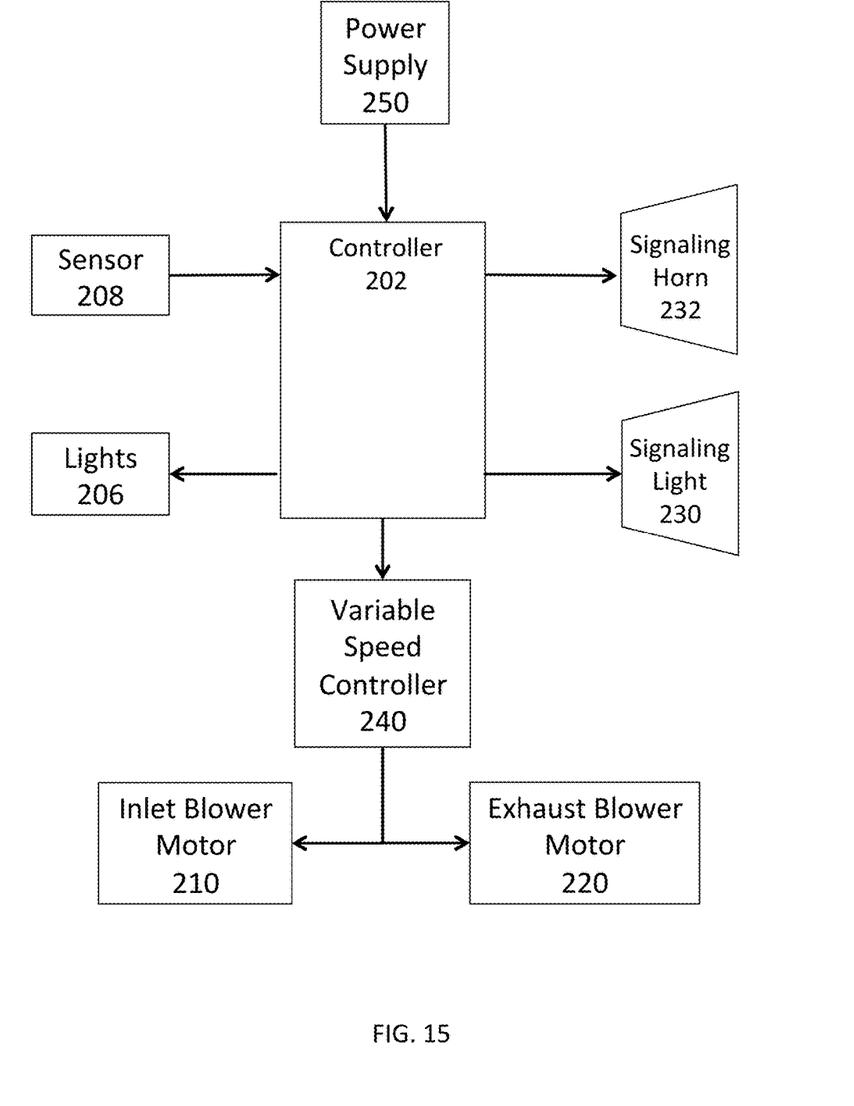
FIG. 15 is a block diagram of a configuration of the electrical components that may be used with the oil extraction booth of the present invention.

FIG. 15 is a block diagram of a configuration of the electrical components that may be used with the oil extraction booth of the present invention. The controller 202 may include a programmable microprocessor and various analog and digital inputs and outputs. When the extraction booth 200 is in use, the controller 202, through a speed controller 240, will direct that the inlet and exhaust blower motors 210, 220 be operated at a base speed sufficient to provide an adequate air flow through the booth, as previously described. The gas detection sensor 208 is electrically coupled to an input of the controller 202 and provides a signal that is received and interpreted by the controller 202. If the sensor 208 detects flammable or hazardous gas in excess of a first predetermined level, the controller 202, again through the speed controller 240, directs that the speed of the motors 210, 220 increase to a higher flow rate. The controller 202 may also activate the visual warning light 230 electrically coupled to an output of the controller 202. If the sensor 208 detects flammable or hazardous gas in excess of a second, higher predetermined level, the system may activate the audible alarm 232, also electrically coupled to an output of the controller 202. The controller 202 may be programmed to also increase the speed of the motors 210, 220 to a still higher level for additional air flow.

The electrical components 208, 210, 220, 230, 232, 240 may be powered by a power supply 250 through the controller 202. The interior lighting fixtures 206 may also be electrically coupled to the power supply 250 through the controller 202. Switches and other controls on the controller may allow for manual activation of one or more of the components.

The present invention may provide significant savings in energy usage. Heating and cooling of air in buildings uses energy. When that air is exhausted to outside a building, make-up air must be brought into the building to replace the exhausted air. The make-up air must be heated and/or cooled in many instances, which consumes energy. If a conventional paint spray booth with a floor space similar to the present invention was used instead of the present invention, the air flow rate for the paint spray booth may be around 5,000 to 7,000 cubic feet per minute. All of this air volume would need to be heated and/or cooled. The base exhaust air flow rate for the present invention is 500 cubic feet per minute. Therefore, with the present invention, only 500 cubic feet per minute of air must be heated or cooled, compared to 5,000 to 7,000 cubic feet per minute in a paint spray booth of equivalent size. The energy savings in this instance would range from about 90 percent to 93 percent.

The description of the present invention has been presented for purposes of illustration and is not intended to be exhaustive or limited to the embodiments in the form disclosed. Dimensions and materials have been presented as representative examples only and are not to be considered critical or limiting. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An oil extraction booth, comprising:
   a plurality of pre-fabricated wall panels;
   a plurality of pre-fabricated ceiling panels;
   a door;
   a ventilation system configured to remove air from the booth, comprising:
     an air intake configured to pass filtered air into the booth;
     a vertical exhaust duct secured to a wall panel and having an open upper end at or above the ceiling panels and a lower end proximate to a floor;
     an exhaust vent in the lower end of the exhaust duct; and
     an exhaust fan coupled to the upper end of the exhaust duct external to the booth above the ceiling panels;
   ports in one or more wall panels through which piping from equipment located outside the booth passes;
   an electrical panel secured to the outside of a wall panel configured to control the equipment located outside the booth; and
   a monitoring system, comprising:
     at least one sensor sensitive to the presence of one or more gases or liquids within the booth; and
     a monitor to which the at least one sensor is coupled and programmed to provide an alarm when the concentration of the one or more gases or liquids exceeds a first predetermined level.

2. The oil extraction booth of claim 1, wherein the monitor is configured to increase the speed of the exhaust fan when the concentration of the one or more gases or liquids exceeds a second predetermined level.

3. The oil extraction booth of claim 2, wherein the monitor is configured to increase the speed of the exhaust fan to increase the flow of filtered air through the extraction booth from approximately 500 cubic feet per minute (cfm) to approximately 1,220 cfm.

4. The oil extraction booth of claim 2, wherein:
   the first predetermined value equals approximately 10% above an explosive limit; and
   the second predetermined value equals approximately 25% above the explosive limit.

5. The oil extraction booth of claim 2, wherein the monitor is configured to shut of a supply of solvent when the concentration of the one or more gases or liquids exceeds a third predetermined level.

6. An oil extraction booth, comprising:
   first and second pre-fabricated side modules securable to each other to create a first air-tight interior work space;
   an inlet blower mechanically coupled to first ductwork between inner and outer walls of the first side module and configured to move air from the exterior of the extraction booth, through the first ductwork, and into the work space;
   an exhaust blower mechanically coupled to second ductwork between inner and outer walls of the second side module and configured to remove air from the work space, through the second ductwork, and into the exterior of the extraction booth;
   a sensor sensitive to the presence of a gas within the work space; and
   a controller electrically coupled to control the speed of the inlet blower and the exhaust blower and electrically coupled to receive a signal from the sensor indicative of an amount of the gas in the work space, the controller configured to:
     operate the inlet blower and the outlet blower at a first speed when the amount of the gas detected by the sensor is less than a first predetermined value; and
     operate the inlet blower and the outlet blower at a second, higher speed when the amount of the gas detected by the sensor equals or exceeds the first predetermined value.

7. The oil extraction booth of claim 6, wherein the controller is configured to activate an audible alarm when the amount of the gas in the work space exceeds a second predetermined value, greater than the first predetermined value.

8. The oil extraction booth of claim 7, wherein:
   the first predetermined value equals approximately 10% above an explosive limit; and
   the second predetermined value equals approximately 25% above the explosive limit.

9. The oil extraction booth of claim 6, wherein:
   the first speed produces an air flow through the work space of approximately 500 cubic feet per minute (cfm); and
   the second speed produces an air flow through the work space of approximately 1,220 cfm.

10. The oil extraction booth of claim 6, further comprising at least one pre-fabricated expansion module securable between the first and second side modules to create a second air tight interior work space, larger than the first work space.

11. The oil extraction booth of claim 10, wherein at least one of the side modules and expansion modules comprises an air-tight door.

12. The oil extraction booth of claim 6, wherein each of the first and second ductworks comprise:
   a first set of vents across the inner wall at a first height above a floor of the booth;
   a second set of vents across the inner wall at a second height above the floor less than the first height; and
   a third set of vents across the inner wall at a third height above the floor less than the second height.

13. The oil extraction booth of claim 12, wherein:
   the first set of vents is adjacent to a ceiling of the booth; and
   the third set of vents is adjacent to the floor of the booth.

14. The oil extraction booth of claim 12, wherein:
   the first set of vents has a first open area;
   the second set of vents has a second open area; and
   the third set of vents a third open area greater than the first and second areas.

15. The oil extraction booth of claim 6, further comprising interior lighting fixtures rated for hazardous environments.

16. The oil extraction booth of claim 1, wherein:
   the vertical exhaust duct is secured to an interior side of a wall panel; and the upper end of the vertical exhaust duct extends through an opening in a ceiling panel.

* * * * *